US007881971B1

(12) United States Patent
Nguyen et al.

(10) Patent No.: US 7,881,971 B1
(45) Date of Patent: Feb. 1, 2011

(54) AUTOMATED GIFTING

(75) Inventors: Luan K. Nguyen, Seattle, WA (US); Aaron Allen Fischer, Seattle, WA (US)

(73) Assignee: Amazon Technologies, Inc., Incline Village, NV (US)

( * ) Notice: Subject to any disclaimer, the term of this patent is extended or adjusted under 35 U.S.C. 154(b) by 1343 days.

(21) Appl. No.: 11/394,381

(22) Filed: Mar. 30, 2006

(51) Int. Cl.
  *G06Q 30/00* (2006.01)
(52) U.S. Cl. .......................................... 705/26
(58) Field of Classification Search .................. 705/26, 705/27
  See application file for complete search history.

(56) References Cited

U.S. PATENT DOCUMENTS

| | | | | |
|---|---|---|---|---|
| 7,130,820 | B2 * | 10/2006 | Song ............................ | 705/26 |
| 7,177,825 | B1 * | 2/2007 | Borders et al. ................. | 705/26 |
| 7,496,518 | B1 * | 2/2009 | Cayton et al. .................. | 705/1 |
| 7,599,855 | B2 * | 10/2009 | Sussman ....................... | 705/26 |
| 2001/0042047 | A1 * | 11/2001 | Nishida ........................ | 705/51 |
| 2002/0040338 | A1 * | 4/2002 | Sick et al. ..................... | 705/37 |
| 2002/0077929 | A1 * | 6/2002 | Knorr et al. ................... | 705/26 |
| 2002/0178078 | A1 * | 11/2002 | OToole ......................... | 705/26 |
| 2003/0074253 | A1 * | 4/2003 | Scheuring et al. ............. | 705/10 |
| 2003/0093388 | A1 * | 5/2003 | Albright ....................... | 705/400 |
| 2004/0019529 | A1 * | 1/2004 | Broussard et al. ............. | 705/26 |
| 2005/0261988 | A1 * | 11/2005 | Horel et al. ................... | 705/27 |
| 2006/0095338 | A1 * | 5/2006 | Seidel .......................... | 705/26 |
| 2006/0122926 | A1 * | 6/2006 | Hsu et al. ..................... | 705/35 |
| 2006/0178946 | A1 * | 8/2006 | Agarwal ....................... | 705/26 |
| 2007/0143189 | A1 * | 6/2007 | Mitchem ...................... | 705/26 |

OTHER PUBLICATIONS

Business editors, "Shopnow.com Launches Gift Center and New Online Personal Shopper Assistants Across Shopnow Network," Business Wire, New York, Nov. 17, 1999, p. 1.*

* cited by examiner

*Primary Examiner*—Amee A Shah
(74) *Attorney, Agent, or Firm*—Fenwick & West LLP

(57) ABSTRACT

Systems and methods provide a facility for automated gifting. The facility receives from a gifter an identification of a gift recipient, an indication of an occasion, and selection criteria. The facility automatically selects a proposed gift for the indicated occasion based on at least the received selection criteria and, in the absence of further direction from the gifter, sends the gift to the recipient.

80 Claims, 12 Drawing Sheets

Gift History – Joe Smith

Gifts you gave to Joe Smith in 2005:

| | 610 | |
|---|---|---|
| MP3 player | given | 12/21/2005 — 602 |
| 12-piece knife set | given | 12/18/2005 (Christmas) — 604 |
| Chocolates and fruits | automatically given | 9/9/2005 (Anniversary) — 606 |
| | | More . . . . — 608 |

AUTOMATED GIFTING

BACKGROUND

Gifting is the act of a "gifter" providing a "gift" to a "recipient." The gifter and recipient can each be an individual or a group. Gifts can be products, services, or anything else that the gifter desires to provide to the recipient.

A gifter generally provides one or more gifts to a recipient on or near various occasions, such as occasions relating to the gifter, the recipient, both the gifter and recipient, someone else entirely, or some other event unrelated to the gifter, recipient, or anyone else. Examples of common occasions for gifting are birthdays, marriages, anniversaries, celebrations, holidays, special events, and so forth. Some occasions for gifting are periodic (e.g., birthdays, anniversaries, holidays, etc.). Other occasions for gifting are occasional or one-time events (e.g., marriages, graduation from a school or university, job promotions, etc.). Occasions may also be unrelated to a specific date or event.

A problem experienced by some gifters is a lack of time to select or to send a gift. As an example, several weeks before a relative's birthday a gifter may remember to send a gift to the relative for the birthday, but the gifter may have insufficient time to select or send a gift as the date approaches, or may forget the date near the actual date of the birthday, e.g., because the gifter is preoccupied with other matters. The gifter may also find it difficult to select an appropriate gift from the millions of products or services that are available to be gifted.

BRIEF DESCRIPTION OF THE DRAWINGS

FIGS. 2-8 are example of a display diagrams illustrating aspects of user interfaces provided by the facility in various embodiments.

DETAILED DESCRIPTION

Figure 1:
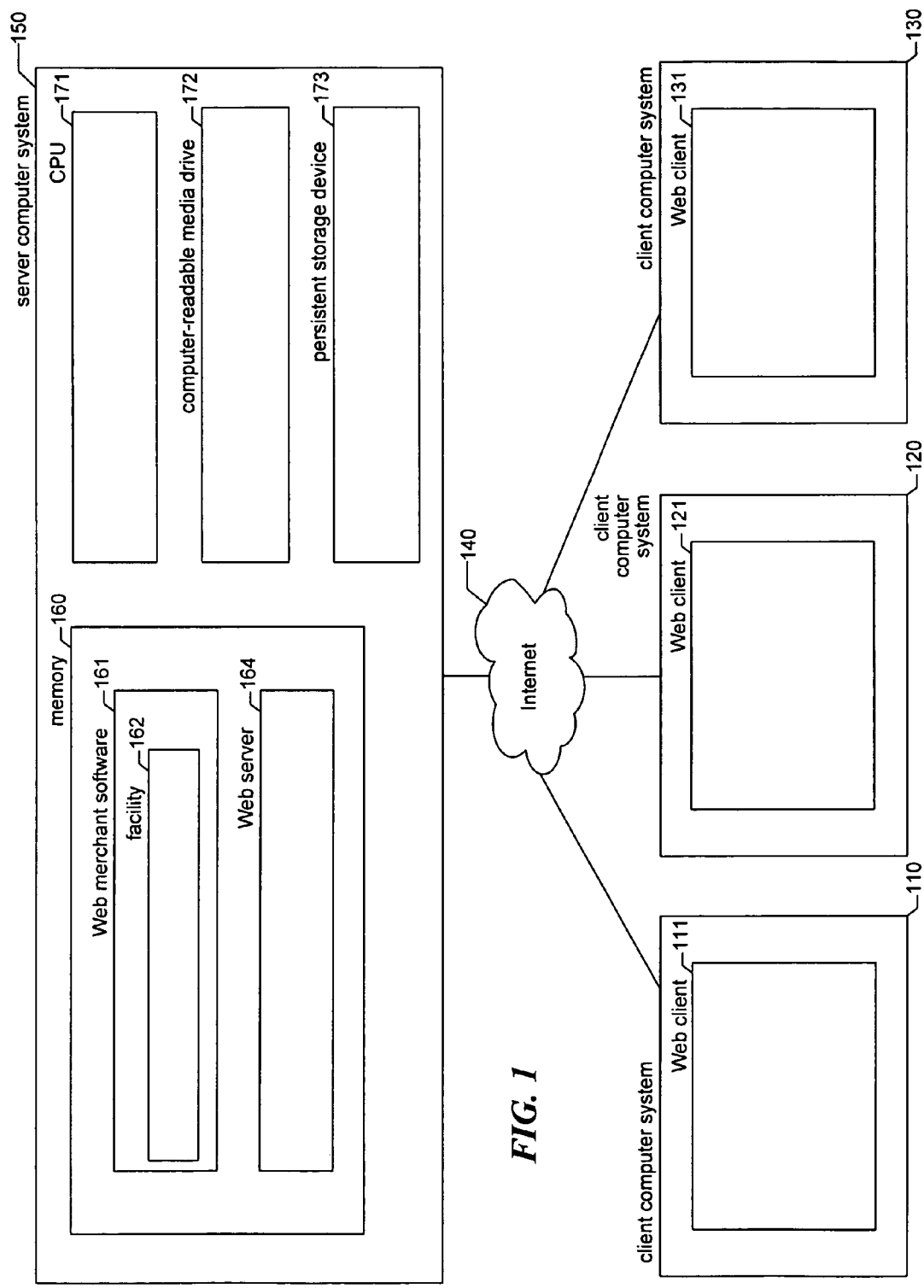
FIG. 1 is a block diagram illustrating an example of an operational environment in which a facility for automated gifting operates in some embodiments.

A facility is described for automated gifting (the "facility"). In various embodiments, the facility enables a gifter to perform gifting in an automated manner by identifying a recipient and providing criteria that the facility employs to select one or more gifts that the facility can send to the recipient without further input from the gifter. The gifting can be associated with an occasion identified by the gifter. The facility then selects a gift and sends the selected gift to the recipient, such as on or near the occasion's date. In various embodiments, the facility provides notifications, such as to the gifter, and enables the gifter to select an alternate gift or to cancel the gifting before the facility causes the gift to be sent.

A gifter inputs to a computer system a set of criteria to identify gifts that are acceptable to the gifter. Examples of criteria include product categories, price ranges, sales ranks, indications of wish lists identifying lists of desired gifts, gifter or recipient attributes (e.g., preferences, hobbies, etc.), browse nodes, and so forth. Browse nodes are described in further detail below. The gifter may also identify an occasion or a date as a criterion. As an example, the gifter may indicate a particular date, such as the recipient's birthday, and provide other criteria that the facility employs to select an appropriate birthday gift for the recipient.

In some embodiments, the facility displays to the gifter a set of potential gifts based on the criteria the gifter provides. The facility may display the set of potential gifts upon receiving the criteria or at a later time, such as before sending a gift. The gift the facility actually selects may or may not appear in this set of potential gifts. As an example, when gifts appearing in the set of potential gifts no longer match the criteria (e.g., because of a price change) or are unavailable (e.g., because they are sold out), the facility may select a gift that was not included in the displayed list of potential gifts, as is described in further detail below.

The facility may select a gift based on the criteria provided by the gifter. As an example, when it is time to select one or more gifts, such as when providing to the gifter a notification identifying potential gifts, or when sending a gift, the facility evaluates the criteria to select a list of potential gifts. In some embodiments, the facility performs a union operation with all the criteria to select the list of potential gifts. A union operation combines all indicated criteria (e.g., to identify an intersection of all criteria). In some embodiments, the gifter indicates how the criteria are to be combined. As an example, the gifter may provide logical operators (e.g., "and," "or," "not," etc.) to evaluate when combining the criteria. In various embodiments, the gifter or the facility may assign priorities. As an example, either the gifter or the facility may determine that the color pink is more important than the price.

In some embodiments, the facility can select gifts from wish lists. A wish list is a list of items that someone desires to purchase or receive. A wish list can be created by the gifter, the recipient, a third party, or multiple users (e.g., users belonging to a group or community). A wish list can contain a list of items that the creator of the wish list desires or believes may be desired by someone else. The gifter can provide criteria identifying one or more wish lists. Accordingly, when the gifter identifies wish lists, the facility may select a gift from one or more of the wish lists.

In some embodiments, a gifter may be able to select gifts from gift guides. A gift guide is a set of items that someone (e.g., another customer, a professional merchandiser, or the facility itself) has selected as related. Examples of gift guides are hiking-related items, party-related items, and so forth. The following provides an example of selecting gifts from a gift guide. When a gifter views a Web site with a gift guide, the gifter may be able to indicate that any gift from the gift guide is acceptable or may specify a particular gift (or set of gifts) from the gift guide that the facility should send. In some embodiments, the gift guide may be combined with other criteria. As an example, a gifter may indicate that any gift from the gift guide within a particular price range should be selected.

In some embodiments, the facility may identify gifts that the recipient has not already received, such as from other gifters or by purchases the recipient made. As an example, when selecting a gift to send automatically, the facility may determine not to send a gift that was previously purchased or received by the recipient.

In some embodiments, the gifter may be able to specify a "lock-in" period at which time the facility locks in a decision to send a gift automatically. At that time, the facility may also have locked in a price and reserved a quantity from inventory. Thus, for example, the gifter can avoid a situation in which a price increase causes a desirable item to no longer match specified criteria. The gifter may also be prevented from changing the gift or canceling the gifting after this "lock-in" period.

Prior to sending a gift, the facility may create a list of potential gifts matching the criteria. The list of potential gifts the facility selects may contain zero or more gifts. When the list contains zero gifts (e.g., if the criteria are too narrow), the facility may send a notification to the gifter with an indication to propose relaxing one or more of the criteria. Notifications are described in further detail below. When the gifter relaxes the criteria, the facility may be able to generate a new set of potential gifts. In some embodiments, when the criteria are not relaxed, the facility may send a notification to the gifter indicating that no gift could be selected based on the criteria. As an example, no gifts may be selectable when no items satisfy the criteria. In other embodiments, the facility may receive an indication of a preference from the gifter to automatically relax criteria until a gift can be selected. The gifter may also indicate an order for relaxing the criteria (e.g., product category followed by price range). In some embodiments, the facility can relax criteria automatically. As an example, the facility may relax criteria in an opposite order from the order in which the criteria were received. Alternatively, or in addition, the facility may relax criteria based on a predetermined order.

In some embodiments, the facility reminds the gifter some time before sending the gift, e.g., by sending an electronic mail ("e-mail") notification, displaying a notification on a Web page, sending an instant message, sending a message using a short message service (popularly referred to as SMS), sending a postcard or letter using a postal service, telephoning the gifter, sending a fax to the gifter, and so forth. As an example, the facility may display the notification when the gifter browses a Web page associated with the facility. Upon reviewing the notification, the gifter can cancel the gift, select a different item, or postpone gifting. If the gifter does not cancel the gift, select another item, or postpone gifting, the facility automatically causes the gift to be sent without any further input from the gifter. The facility may select a date for sending the gift that will ensure that the gift arrives at the recipient's location on or near the day of the identified occasion. As an example, the gifter may indicate that the gift is not to arrive (or be sent) before or after a particular date or occasion. Alternatively, the gifter may indicate that the gift is to arrive (or be sent) within a particular range of dates. Thus, the facility enables automated gifting, such as when the gifter forgets to send a gift or does not have sufficient time to select or send a gift.

In some embodiments, the facility notifies the gifter that the recipient may have already received a gift for an occasion. As an example, if the gifter has indicated to automatically send a birthday gift and later selects and attempts to send a gift manually to the recipient near the time of the recipient's birthday, the facility may notify the gifter that a birthday gift has already been selected for sending, or already sent, automatically. In some embodiments, a notification sent as part of the automated gifting process may inform the gifter that the gifter recently sent a gift to the recipient manually so that the gifter can elect to cancel the automatically selected gift for the occasion.

Multiple gifters may wish to send a gift to a recipient, such as for the same occasion. To avoid sending similar or identical gifts in such cases, the facility may select different gifts for the recipient, each from a different gifter. In some embodiments, gifters may need to publish their gifting criteria to enable this feature. As an example, gifters may need to indicate that their gifting information can be used by the facility when selecting a gift for another gifter. In some embodiments, the facility may select different gifts when it selects gifts automatically without making clear to the gifters that it is doing so.

In some embodiments, the facility sends a notification after the gift has been sent. As an example, when the gift has been sent automatically by the facility, the facility may send a notification to the gifter identifying the exact gift that was sent and perhaps attributes relating to the gift, such as price. In some embodiments, the facility may also send a notification to the recipient indicating that a gift from the gifter is on its way.

In some embodiments, the facility sends a notification to the gifter indicating that the recipient has received the gift. The facility may receive an indication that the gift has been received from the recipient or another party. As an example, a recipient may indicate to the facility that the recipient has received the gift. Alternatively, the facility may receive an indication from the shipping company used to send the gift that the recipient has received the gift. The facility may then send a notification to the gifter. The notification may include an acknowledgement of the gift (e.g., a thank you).

The facility stores information it receives from gifters and others, such as in a database or other storage associated with the facility. The facility may store information it receives from the gifter with other information, such as information relating to the gifter, recipient, occasion, criteria, wish lists, and so forth. The facility may employ this information when selecting a gift, relaxing criteria, sending notifications, and so forth.

FIG. 1 is a block diagram illustrating an environment in which the facility operates in some embodiments. The block diagram illustrates multiple client computer systems, such as client computer systems 110, 120, and 130. Such client computer systems may include personal computers, laptops, workstations, personal digital assistants ("PDAs"), wireless phones, portable gaming devices, electronic book readers, etc. Each client computer system has a Web client computer program for browsing the World Wide Web, such as Web clients 111, 121, and 131. The client computer systems are connected via the Internet 140 to a server computer system 150 hosting the facility. However, those skilled in the art will recognize that client computer systems could be connected to the server computer system by wired or wireless networks other than the Internet, e.g., a local area network, wide area networks, cable network, etc. It will also be appreciated that the server computer system may include one or more servers in the illustrated embodiment.

The server computer system 150 contains a memory 160. The memory 160 contains Web merchant software 161 incorporating the facility 162.

The memory further contains a Web server computer program 164 for delivering Web pages, such as in response to requests from Web clients. While items 161, 162, and 164 can be stored in memory while being used, those skilled in the art will appreciate that these items, or portions of them, may be transferred between memory and a secondary memory, such as persistent storage device 173, for purposes of memory management and data integrity. The server computer system further contains one or more central processing units (CPUs) 171 for executing programs, such as programs 161, 162, and 164, and a computer-readable medium drive 172 for reading information or installing programs such as the facility from computer-readable media, such as a floppy disk, a CD-ROM, DVD, or any other media form.

While preferred embodiments are described in terms of the environment described above, those skilled in the art will appreciate that the facility may be implemented in a variety of other environments, including a single, monolithic computer system, as well as various other combinations of computer systems or similar devices connected in various ways.

FIGS. 2-8 are display diagrams illustrating aspects of user interfaces provided by the facility in various embodiments. While specific types of user interface elements may be identified and discussed below, other types of user interface elements are equally contemplated. As examples, a dialog box or window can be used instead of a Web page, an image can be used instead of a link or pushbutton, and so forth. Those skilled in the art will recognize that various types of user interface elements can be used to provide similar or equivalent functionality.

Figure 2:
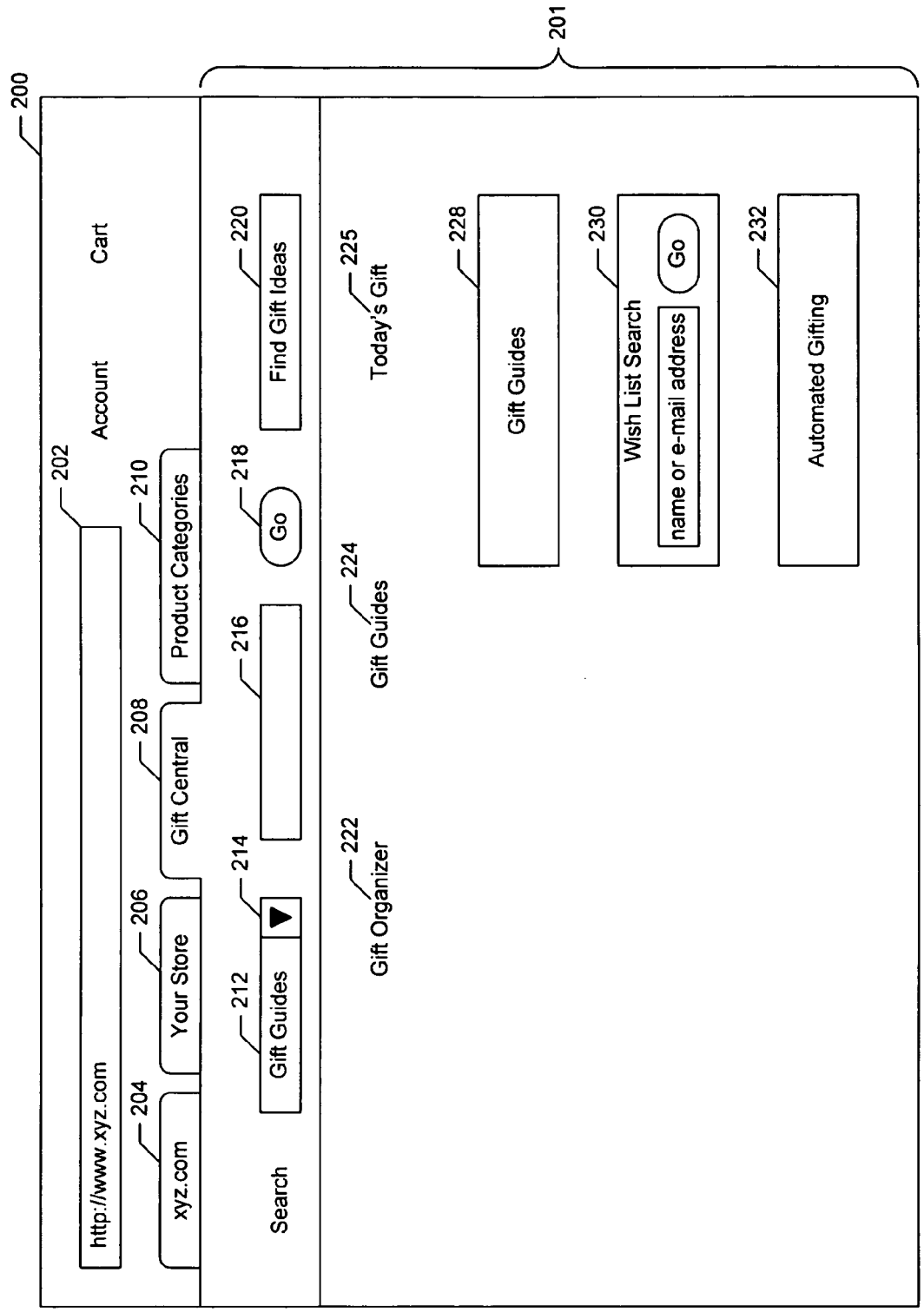

FIG. 2 is a display diagram illustrating a Web browser window 200 containing an example of a user interface provided by the facility in some embodiments. A user (e.g., gifter) can navigate to a Web page, such as a Web page associated with the facility, by selecting a link from another Web page or an entry in a list of favorite Web pages, or by providing a uniform resource identifier (URI), e.g., a uniform resource locator (URL), in an address bar 202 associated with the Web browser. The Web page provides links to other features of the Web site associated with the facility, such as a home page 204, a personalized shopping store 206, or a list of relevant product categories 210. The facility additionally provides a gift selection region 201 that is displayed by selecting a "Gift Central" region 208. The Gift Central region can be a pushbutton, link, tab, or other user interface element that causes the Web page to load the gift selection region.

When the user selects the Gift Central region, the user can search for various gifts. As an example, the user can select a category to search (e.g., Gift Guides, Books, Electronics, Toys, Video Games, and so forth) in a list 212, such as by depressing an expansion control 214 and selecting a category from a list of categories that appears near the list 212. The user can search among items in the selected category by entering text in a text region 216 and depressing a Go region 218 (e.g., a "submit" button). Alternatively, the user can select a Find Gift Ideas control 220 for additional assistance in finding a gift.

The gift selection region displays links to gift selection tools, such as a Gift Organizer 222, Gift Guides 224, and "Today's Gift" 225. When a user selects any of these links, the Web browser loads a Web page with information for the selected tool.

The gift selection region can also have multiple gift selection tool regions, such as a Gift Guides region 228, Wish List Search region 230, and Automated Gifting region 232. The Gift Guides region provides information about one or more gift guides, such as a sponsoring gift guide. A gift guide combines multiple potential gifts. As an example, a "gamer" gift guide may include a gaming console, video games, and books. A sponsor (e.g., an advertiser) may sponsor a gift guide, such as to include gifts relating to the sponsor's products.

The Wish List Search region enables a gifter to search for published wish lists, such as a wish list of a potential gift recipient. As an example, the gifter can search for the recipient's wish lists by indicating the recipient's e-mail address, name, user identifier, postal address, telephone number, voice over Internet protocol address, Internet Protocol address, or other identifier.

The Automated Gifting region provides information relating to the facility. As an example, the automated gifting region may indicate that the facility is available for the gifter's use and explain how to use it.

A user may select a gift selection tool region, such as by placing a mouse pointer on a region and momentarily depressing a mouse button, causing the Web browser to load a Web page relating to the selected gift selection tool region.

Figure 3:
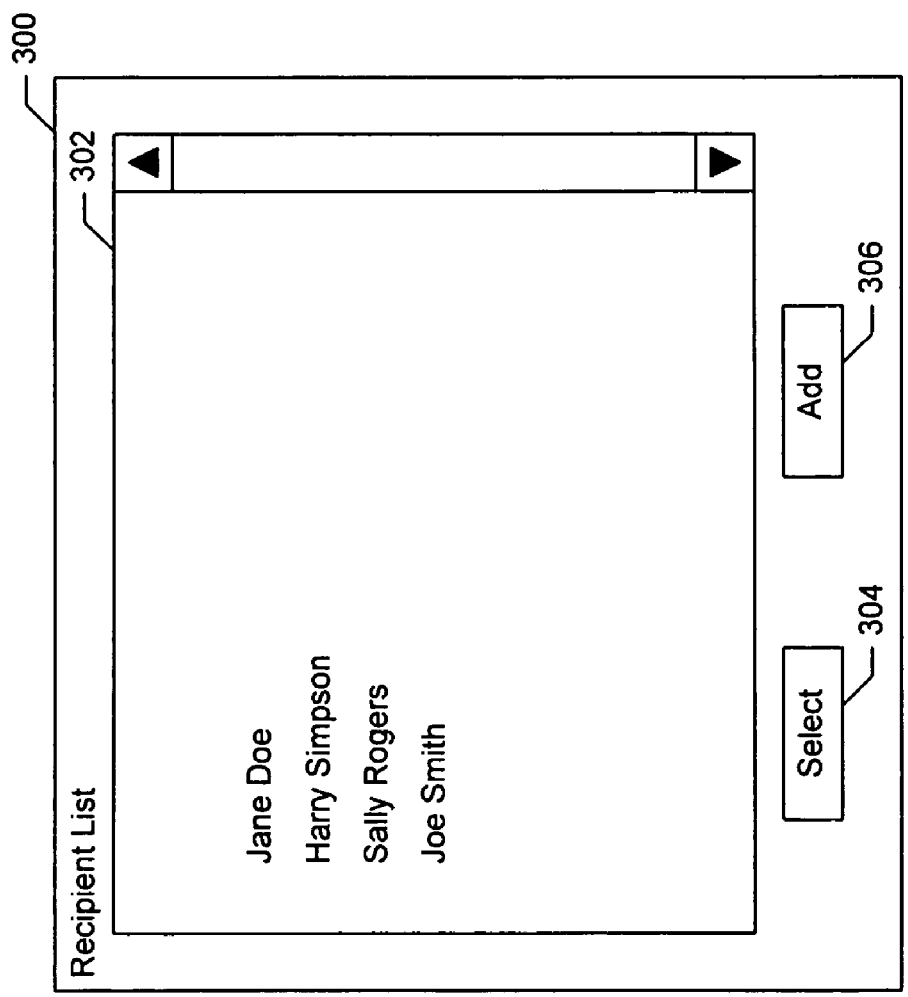

FIG. 3 is a display diagram illustrating an example of a user interface for providing a list of recipients that the user has previously identified. In various embodiments, a Web page 300 includes a list region 302, Select control 304, and Add control 306. The list region reflects recipients that the user has previously identified. The user can select one of the listed recipients and then select the Select control (e.g., a pushbutton) to cause the Web browser to load another Web page that enables the user to perform some actions in relation to the selected recipient. Alternatively, the user can select the Add control to add an additional recipient to the recipient list. Upon adding the additional recipient, the user can select the new recipient, such as to provide details relating to the new recipient (e.g., by using the user interface described immediately below in relation to FIG. 4).

Recipients can be identified by using an e-mail address, name, user identifier, postal address, telephone number, voice over Internet protocol address, Internet Protocol address, or other identifier. A name can also be associated with the recipient. The list region may display either the name or the identifier associated with the recipient.

Figure 4:
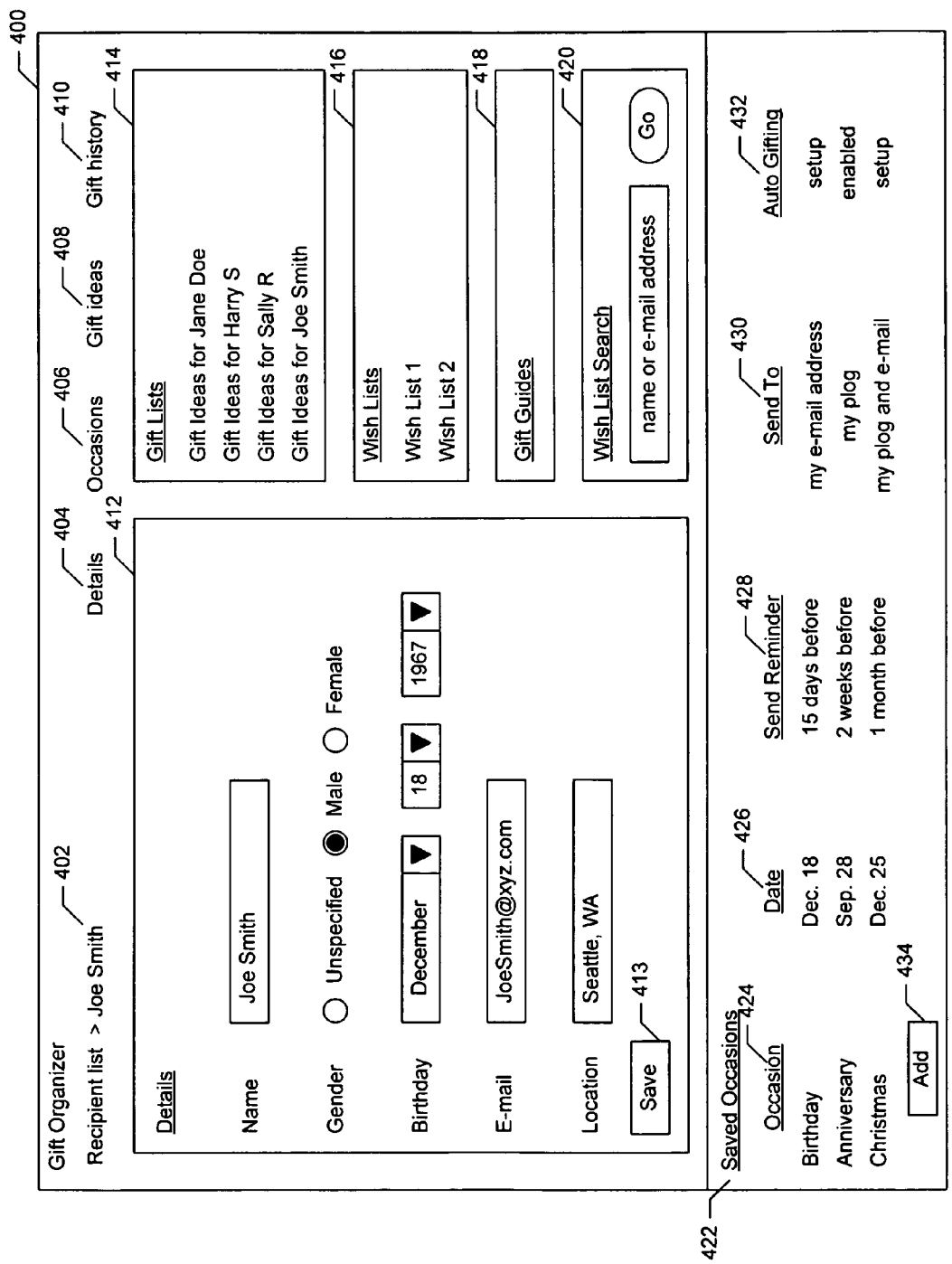

FIG. 4 is a display diagram illustrating an example of a Gift Organizer user interface provided by the facility in some embodiments. The Web page 400 is retrieved by the browser when the user performs an action, such as by selecting the Gift Organizer link 222 illustrated in FIG. 2, typing in a URL, and so forth.

The Web page indicates that the displayed Gift Organizer details relate to recipient "Joe Smith," as identified by the recipient region 402. By selecting "Recipient list," which is located near the recipient region, the user can cause the browser to display a list of gift recipients that the user has previously identified so that another recipient can be selected. As an example, the browser may display the user interface described above in relation to FIG. 3.

The Web page 400 includes a Details link 404, an Occasions link 406, a Gift ideas link 408, and a Gift history link 410. When the user selects the Details link, the Web browser displays a Details region 412. The Details region collects information pertaining to the recipient identified at recipient region 402 and provides previously collected information pertaining to that recipient. Examples of pertinent information include name, gender, birthday, e-mail address, geographic location, and so forth. Upon entering or revising this information, the user can select a Save control 413 to save the information. When the user selects the Save control, the facility stores this information in a storage associated with the facility, such as in storage device 173 illustrated in FIG. 1.

When the user selects the Occasions link, the Web browser displays information relating to Occasions, such as a Saved Occasions region 422. Alternatively, the Web browser may provide additional information relating to Occasions in place of the Details region 412. Examples of common occasions for gifting are birthdays, marriages, anniversaries, celebrations, holidays, special events, and so forth. Some occasions for gifting are periodic (e.g., birthdays, anniversaries, holidays, etc.). Other occasions for gifting are occasional or one-time events (e.g., marriages, graduation from a school or university, job promotions, etc.). Occasions may also be unrelated to a specific date or event.

When the user selects the Gift ideas link 408, the Web browser displays ideas for gifts, such as potential gifts for the selected recipient. These gift ideas may be based on attributes relating to the gifter or recipient, such as items previously purchased, items in wish lists, hobbies, expressed interests, and so forth.

When the user selects the Gift history link 410, the Web browser displays gifts the user previously sent to the recipient, such as in a user interface described below in relation to FIG. 6.

In various embodiments, the Web page additionally has a Gift Lists region 414, a Wish Lists region 416, a Gift Guides region 418, and a Wish List Search region 420. The Gift Lists region provides links to gift ideas that aspects of the facility may have identified for gift recipients the user has previously identified. As an example, the facility may suggest gifts for various occasions. The Wish Lists region provides a list of wish lists the user has created or linked. As an example, the facility may enable the user to link to a community gift list in which others identify gifts. As another example, the facility may enable the user to link to a potential recipient's gift list. The Gift Guides region provides information about one or more gift guides, such as a sponsoring gift guide. This Gift Guides region is similar to the Gift Guides region 228, which was described above in relation to FIG. 2. The Wish List Search region enables the user to search for wish lists, such as by providing a wish list name, user name, user e-mail address, and so forth. Upon finding a wish list, the user may select a gift from the wish list or add a link to found wish lists into the Wish Lists region.

In some embodiments, the Web page additionally has a Saved Occasions region 422. The Saved Occasions region displays occasions that the user has previously indicated to be associated with the recipient identified in recipient region 402. As is illustrated in FIG. 4, the Saved Occasions region displays an identification for the occasion in column 424, a date of the occasion in column 426, a preference previously indicated by the user on whether and when to send a reminder in column 428, a preference previously indicated by the user for where or how to send the reminder in column 430, and links and status for automated gifting for the occasion in column 432.

The user can add a new occasion for the recipient by selecting the Add control 434. When the user selects the Add control, the facility displays a Web page for collecting pertinent information, such as by displaying the user interface described below in relation to FIG. 8.

The user can modify attributes relating to the occasions (including the displayed attributes, such as occasion identification, date, reminder, where to send notifications, and other attributes not displayed) by selecting an associated link in the automated gifting column 432. Examples of links are "setup" and "enabled." The "setup" link may be displayed when automated gifting has not been set up for the occasion. In such a case, the facility may merely send a reminder but may not automatically send a gift. The "enabled" link may be displayed when automated gifting has been set up for the occasion. In the illustrated example, automated gifting has been set up for Joe Smith's Anniversary, but not his Birthday or for Christmas. Moreover, according to the illustrated example, the facility will send a reminder 15 days before Joe Smith's Birthday to the user's e-mail address; a reminder two weeks before Joe Smith's Anniversary to the user's plog; and a reminder one month before Christmas to the user's plog and e-mail address. A plog is a personal Web log (e.g., a personal "blog"). Users may be able to restrict others from viewing their plogs, such as by indicating that no one else or only some selected individuals can view or add entries to their plogs. When the user selects a link (e.g., "setup" or "enabled") in the automated gifting column, the facility causes the user's Web browser to display a user interface that the user can use to enable, change, or disable automated gifting, such as the user interface described below in relation to FIG. 8.

Figure 5:
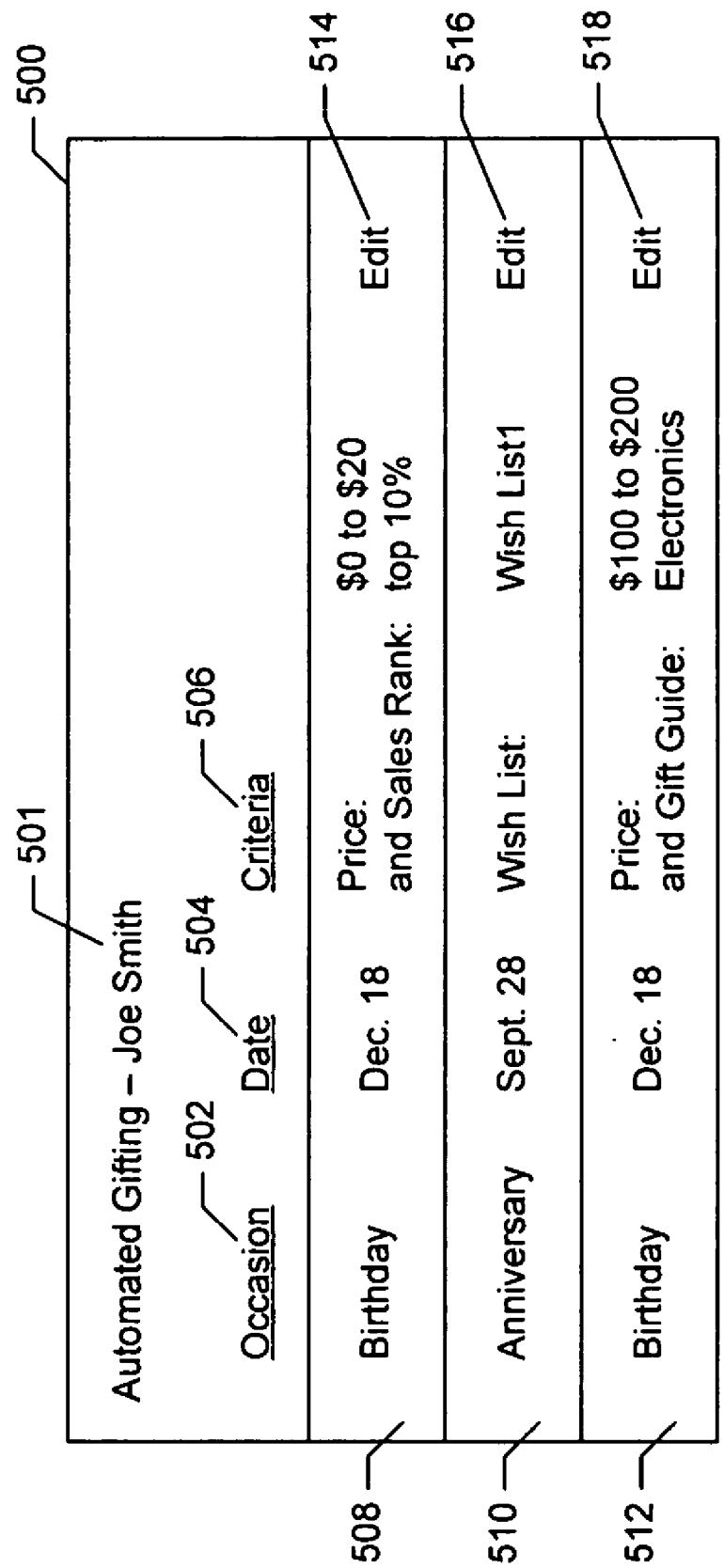

FIG. 5 is a display diagram illustrating an example of an automated gifting Web page provided by the facility in some embodiments. The Web browser may display the automated gifting Web page 500, e.g., when the Automated Gifting region 232 illustrated in FIG. 2 is selected by a user. The Web page may display attributes relating to automated gifting for multiple occasions associated with a recipient identified in recipient region 501 (here, Joe Smith), each in a separate row. As examples, row 508 identifies attributes relating to automated gifting for a Birthday, row 510 identifies attributes relating to automated gifting for an Anniversary, and row 512 identifies a second set of attributes relating to automated gifting for the Birthday. These attributes are identified in columns, such as an Occasion column 502, a Date column 504, and a Criteria column 506. The Occasion column identifies an occasion for each gift. The Date column identifies the date of the occasion. In some embodiments, the gifter may identify a date and not an occasion. The Criteria column identifies criteria that will be used to select a gift.

As is illustrated, various criteria can be specified and one or more criteria can be applied to select a gift. Examples of criteria include product categories, price ranges, sales ranks, indications of wish lists identifying lists of desired gifts, gifter or recipient attributes (e.g., preferences, hobbies, etc.), browse nodes, and so forth. A browse node is a node of a browse tree that identifies a sub-category and a set of items (e.g., potential gifts) corresponding to that sub-category. Each node of the browse tree identifies a sub-category that is associated with a category or sub-category of its ancestor node. As an example, a node descending from a root node of the browse tree may identify an electronics product category. The node corresponding to the electronics product category may have three descendant nodes identifying televisions, radios, and computers. The node corresponding to computers may further have two sub-categories identifying portable and desktop computers. In addition to identifying a sub-category, each node may also identify items associated with the identified sub-category and those of its descendant nodes. As an example, the node corresponding to the electronics category may identify all televisions, radios, and computers as potential gifts. The node corresponding to the computers sub-category may identify all portable and desktop computers. The node corresponding to the portable computers sub-category may identify all portable computers.

Each row also has an edit link, such as edit links 514, 516, and 518. When an edit link from a row is selected, the edit link causes the Web browser to load a Web page for editing the attributes associated with the occasion corresponding to that row. As an example, edit link 514 would load a Web page for editing attributes associated with the Birthday occasion of row 508. When an occasion has multiple entries (e.g., rows 508 and 512 for Birthday), the facility may select and send multiple gifts on that occasion when automated gifting is enabled. As an example, row 508 indicates that a gift costing less than $20 that appears in the top 10% of sales should be sent for Joe Smith's Birthday and row 512 indicates that a gift costing between $100 and $200 and appearing in an Electronics Gift Guide should also be sent for Joe Smith's Birthday.

Row 510 indicates that any item appearing from Wish List1 (of FIG. 4) could be selected for Joe Smith's Anniversary. Because automated gifting is only enabled for the Anniversary occasion (see column 432 of FIG. 4's Saved Occasions region 422), the facility may only send reminders or notifications for the Birthday occasions listed in FIG. 5 and may send a gift automatically for the listed Anniversary occasion.

A user can also indicate a "lock-in" date, which could be displayed in relation to each automated gifting occasion. The lock-in date is a date before which the facility should not send the gift automatically. The user can enter or change the lock-in date when entering or modifying attributes relating to the automated gifting.

FIG. 6 is a display diagram illustrating an example of a Gift History user interface provided by the facility in some embodiments. The illustrated Gift History Web page 600 provides a list of items that a gifter has previously gifted to a recipient. In the illustrated example, the gifter has given to Joe Smith an MP3 player on Dec. 21, 2005 (row 602), a 12-piece knife set on Dec. 18, 2005 for Christmas (row 604), and chocolates and fruits for an Anniversary on Sep. 9, 2005 (row 606). If additional prior gifts are available to be displayed, an additional row 608 could appear with a "More" link which, when selected, would display additional gifts previously given. According to column 610, while the gifts in rows 602 and 604 were "given," the gift in row 606 was "automatically given." This indicates that the automated gifting facility sent the gift identified in row 606 automatically rather than requiring the gifter to explicitly send the gift. As an example, the gifter may not have had the time to send an Anniversary gift. The "automatically given" entry in the column may be a link in some embodiments. When selected, a Web page may be displayed, e.g., indicating criteria used to select the gift.

Figure 7:
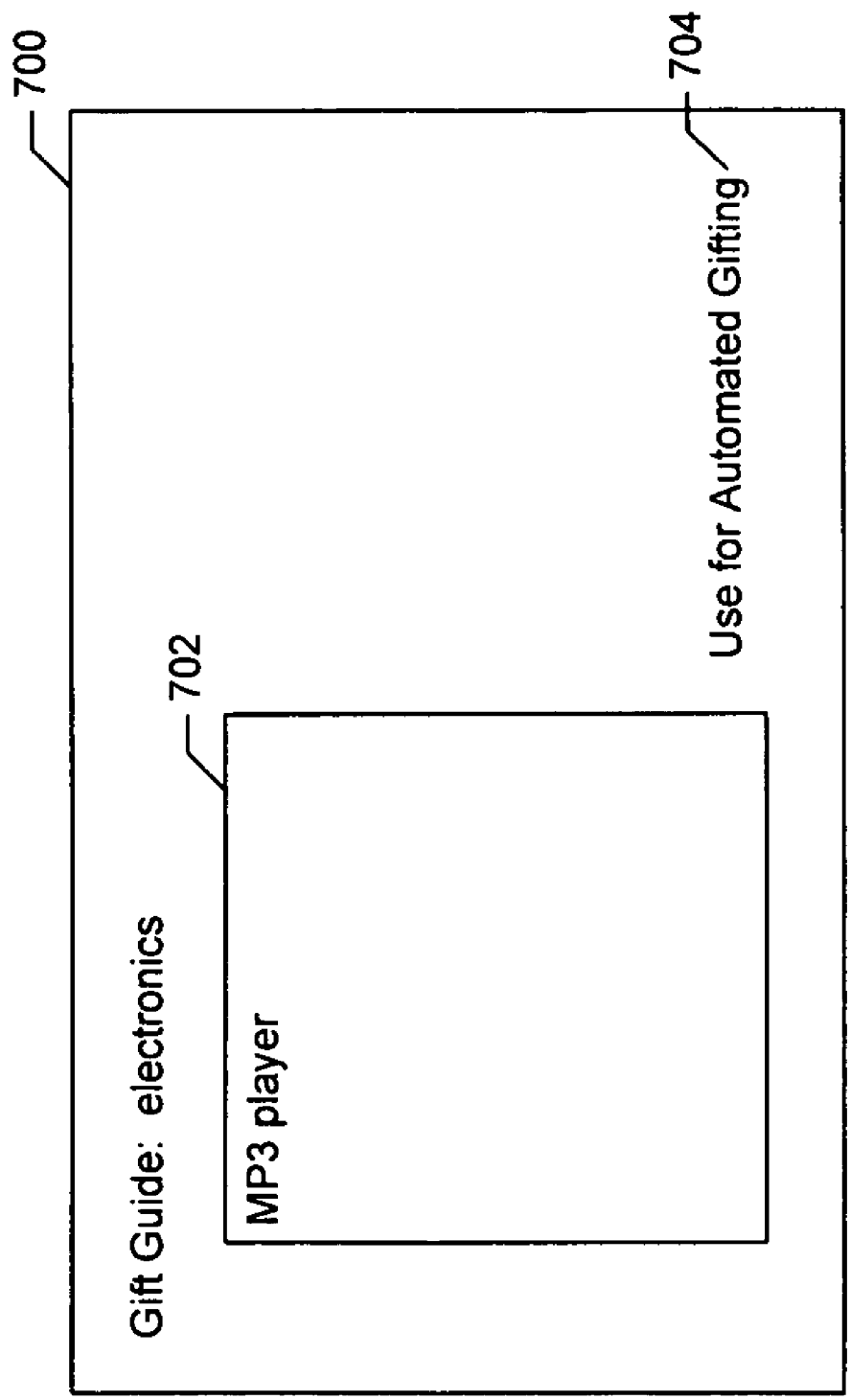

FIG. 7 is a display diagram illustrating an example of a Gift Guide user interface provided by the facility in some embodiments. The illustrated user interface displays a Web page 700 that provides a gift guide relating to electronics. A gifter may have selected a gift (e.g., an MP3 player), which may be described in a region 702. Alternatively, region 702 may provide a list of various products associated with a gift guide (e.g., MP3 player, downloadable MP3 music that can be purchased online, carrying case, memory cards, and so forth). Additionally, the Web page has a "Use for Automated Gifting" link 704 which, when selected, would cause the selected item (or items) from the gift guide to be added to criteria for automated giving. As an example, when a gifter selects the link, the facility may display additional Web pages for selecting a recipient and an occasion, providing additional criteria, and so forth.

Figure 8:
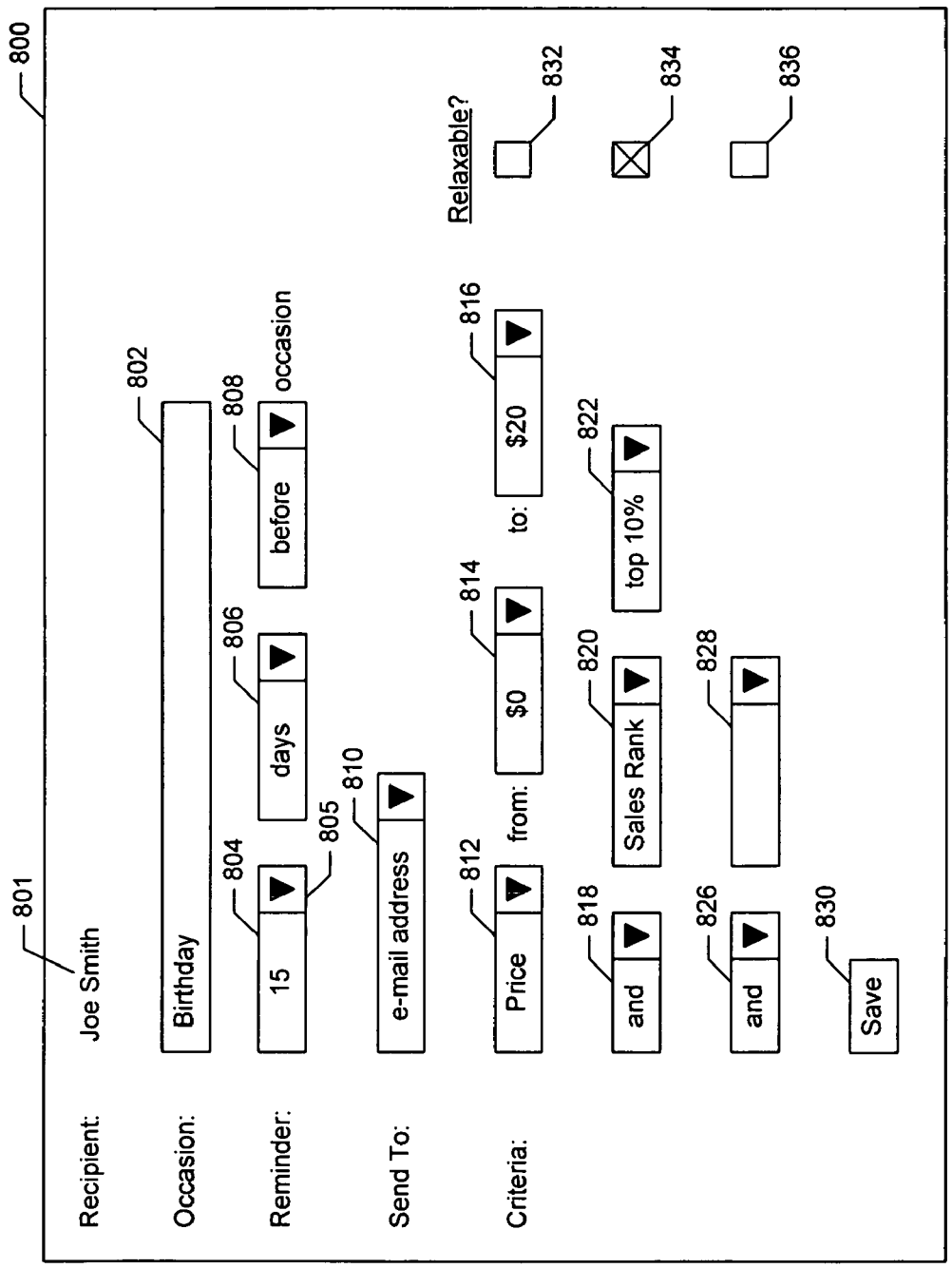

FIG. 8 is a display diagram illustrating an example of a user interface provided by the facility for indicating various attributes associated with automated gifting in some embodiments. A Web page 800 enables a user to provide, view, or modify attributes relating to automated gifting for an occasion. Accordingly, recipient region 801 indicates a recipient for the gift. In various embodiments, this and other recipient regions may provide a name, e-mail address, or other identifier for the recipient.

Region 802 is an edit region for displaying or receiving an identification for an occasion. In various embodiments, the facility may additionally provide a drop-down arrow to indicate that an occasion can be selected from a list of occasions or some other type of list region. In the illustrated embodiment, a user can type in an occasion name, such as "Birthday."

Some regions illustrated in the Web page are provided with an adjacent drop-down arrow, such as drop-down arrow 805. These drop-down arrows indicate that the adjacent region is a list. When a user selects the drop-down arrow, the adjacent list expands to display a list of values or settings that the user can select. In some embodiments, the user may additionally be able to type into an adjacent region directly. In some embodiments, text regions may be used instead of (or in addition to) lists so that users can type values.

The user can indicate to the facility to send a reminder or notification by specifying a duration prior to the occasion when the reminder or notification should be sent. The user can specify the duration by entering or selecting a duration value 804 (e.g., 15), duration measure 806 (e.g., days, weeks, months, etc.), and directional indicator 808 (e.g., "before" or "after"). In the illustrated example, the user has indicated that the facility is to send a notification 15 days before the occasion. In some embodiments, a date for the occasion can additionally be provided through the Web page, another Web page, or both. The occasion date field is not illustrated in FIG. 8.

The user can indicate how to receive a notification by selecting a method in list 810. Examples of methods the facility can use to provide notifications include, e.g., e-mail, plog, Web page, and so forth. In some embodiments, the facility provides the notification when the user logs on to a Web page associated with the facility.

The user can specify one or more criteria for a gift (or set of gifts). Examples of criteria include product categories, price ranges, sales ranks, identifications of wish lists, gifter attributes, recipient attributes, etc. The user can specify criteria by selecting a criteria type (e.g., Price) from a list of criteria types, such as criteria types identified in a list 812. When a criteria type is identified, the Web page displays additional regions in which to enter attributes relating to the criteria. As an example, when Price is identified, lists 814 and 816 appear to enable the user to specify a lower and upper end for the price of the gift. As another example, when the user selects Sales Rank type in list 820, a single list 822 appears, e.g., so the user can indicate the desired sales rank range. Furthermore, the user can indicate logical operators (e.g., "and," "or," "not," etc.) to combine criteria, such as by using logical operator list 818 or 826. When the user selects a criteria type in list 828, another logical operator list region and criteria type list region may appear so that the user can provide additional criteria.

The user can save the specified criteria by selecting a Save control 830. When the user indicates to save the criteria, the facility stores the criteria, such as in a storage associated with the facility.

The user can also indicate which criteria can be relaxed, such as by selecting checkboxes associated with criteria that can be relaxed. In the illustrated example, the Sales Rank criterion can be relaxed because checkbox 834 is checked, but the Price criterion cannot be relaxed because checkbox 832 is unchecked. Checkbox 836 can be selected after selecting a criterion type in list 828. In some embodiments, the user may indicate a priority for relaxation, such as by arranging the criteria in an order or typing in numbers indicating an order. As an example, the user can indicate that the Sales Rank region should be relaxed first, followed by the Price criterion.

Figure 9:
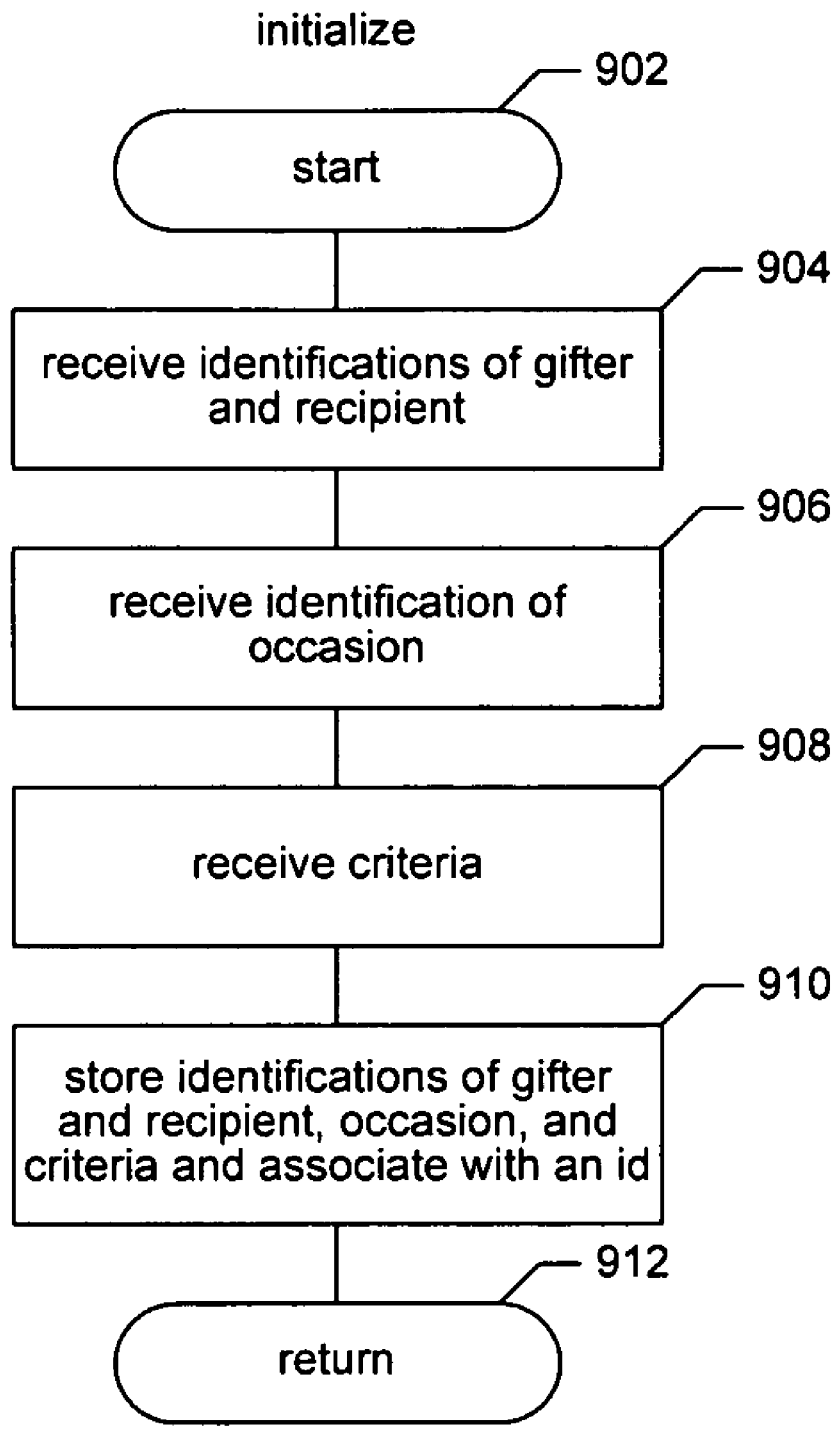
FIG. 9 is a flow diagram illustrating an initialization routine invoked by the facility in some embodiments.
Figure 10:
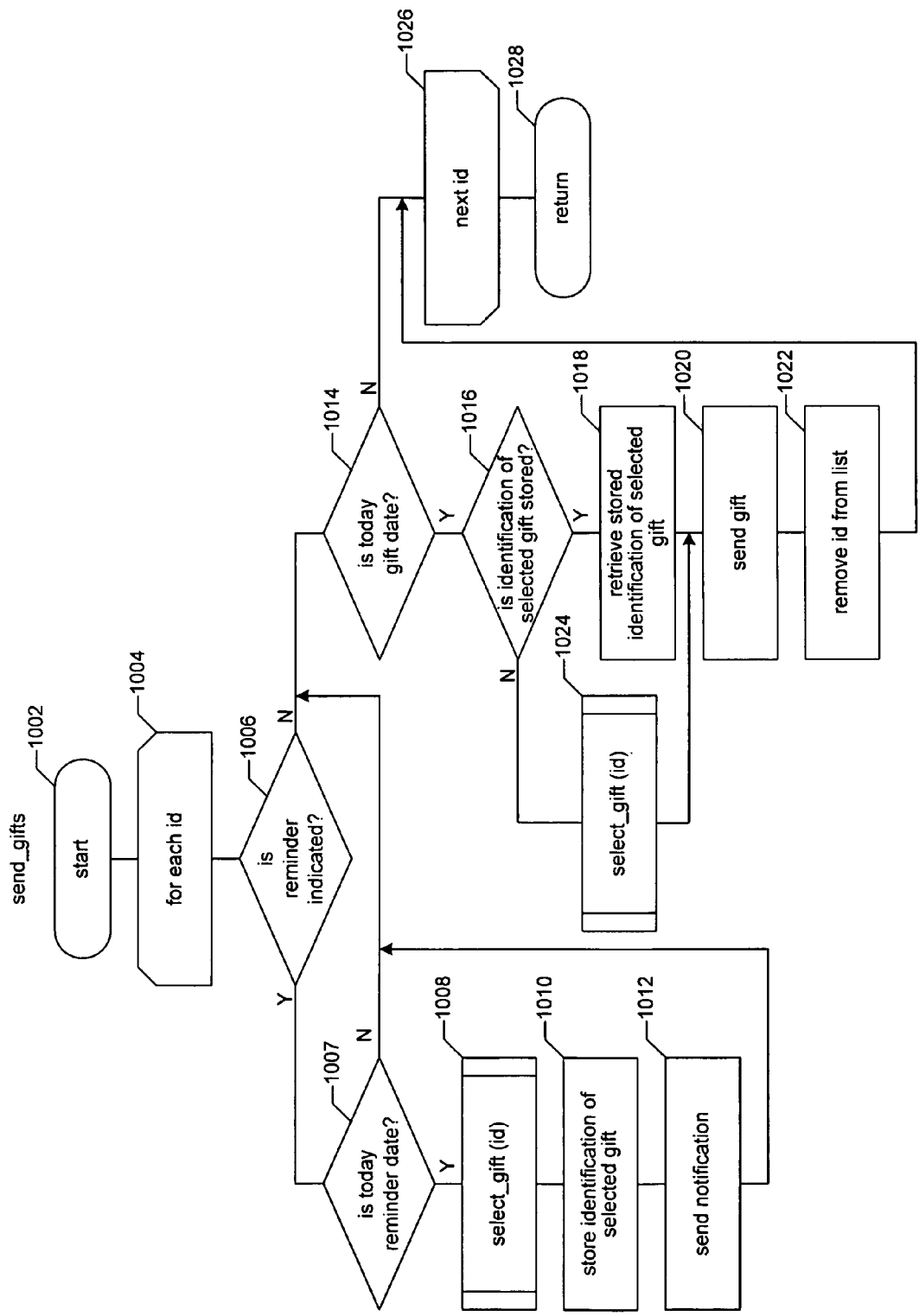
FIG. 10 is a flow diagram illustrating a send_gifts routine invoked by the facility in some embodiments.
Figure 11:
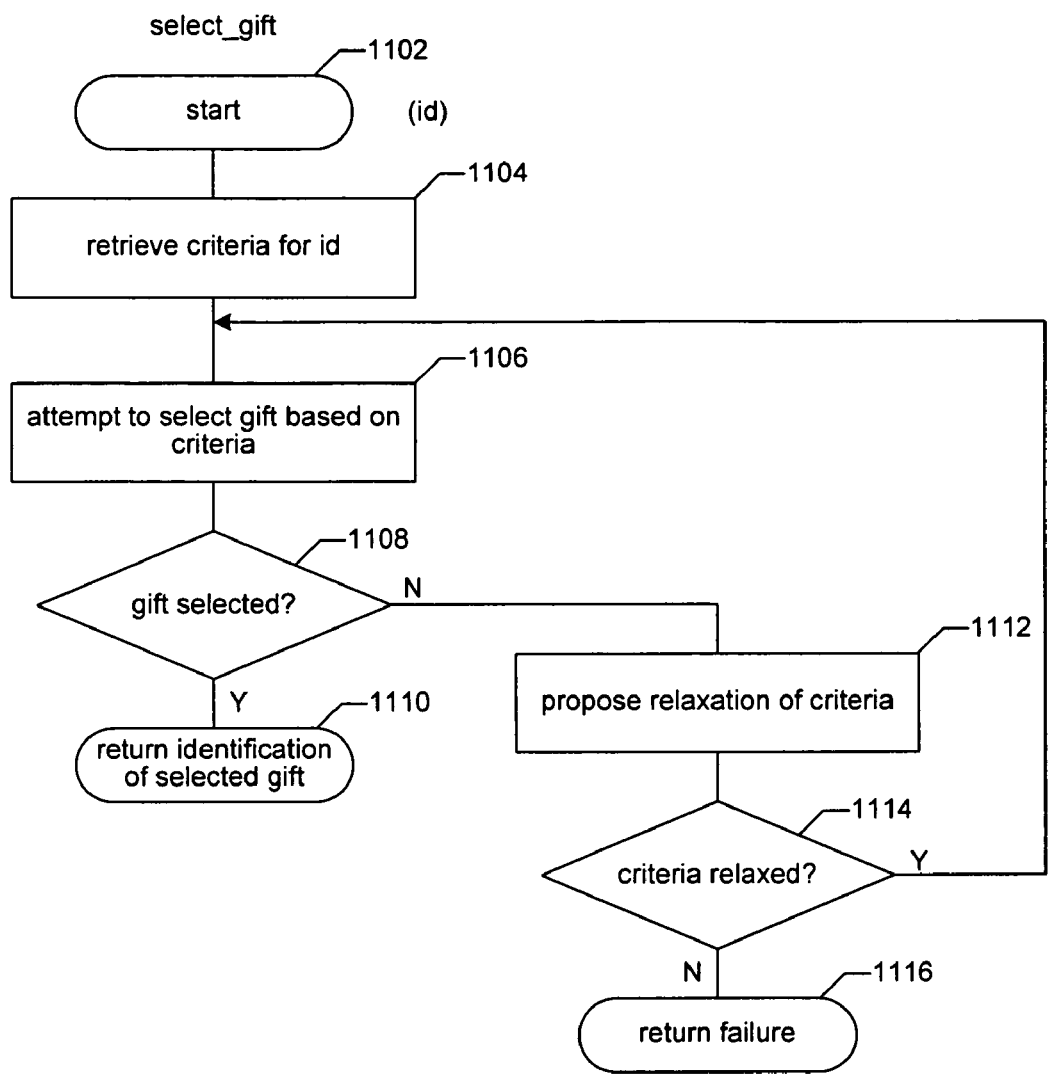
FIG. 11 is a flow diagram illustrating a select_gift routine invoked by the facility in some embodiments.

FIGS. 9 through 11 are flow diagrams illustrating routines invoked by the facility in various embodiments. Those skilled in the art will appreciate that the steps illustrated therein and discussed below may be altered in various ways. As examples, the order of the indicated logic may be rearranged, substeps may be performed in parallel, logic may be omitted or added, etc.

FIG. 9 is a flow diagram illustrating an initialize routine invoked by the facility in some embodiments. The facility can invoke the initialize routine to initialize automated gifting for a gifter. The routine starts at block 902. At block 904, the routine receives identifications of the gifter and recipient, e.g., as described above. As examples, the facility could receive the identifications as e-mail addresses, unique identifiers, or so forth. At block 906, the routine receives an identification of an occasion. As examples, the routine receives an occasion name (e.g., Birthday), date, and so forth. The routine may also receive other attributes relating to the occasion, such as whether and when a reminder or notification is desired.

At block 908, the routine receives criteria for selecting a gift. Examples of criteria include product categories, price ranges, sales ranks, identifications of wish lists, gifter attributes, recipient attributes, etc. At block 910, the routine stores the received information, such as the received identifications of the gifter and recipient, occasion information (e.g., name, date, notification information, etc.), and criteria. This information may be stored in association with an occasion identifier ("id") and subsequently used to implement automatically select and send a gift as described in more detail below. At block 912, the routine returns.

FIG. 10 is a flow diagram illustrating a send_gifts routine invoked by the facility in some embodiments using, for example, the information received and stored as described above in connection with FIG. 9. The facility invokes the send_gifts routine intermittently or periodically to send notifications and gifts. As an example, the facility may invoke the send_gifts routine on a daily basis. The routine begins at block 1002. Between the loop of blocks 1004 and 1026, the routine sends reminders or selects gifts for automated gifting. At block 1004, the routine selects an occasion identifier, such as an occasion identifier associated with information stored at block 910 illustrated in FIG. 9. At block 1006, the routine determines whether a reminder is indicated by the information associated with the selected occasion identifier. As an example, a reminder may be indicated by the information when a user associates a reminder as an attribute of an occasion. If a reminder is indicated, the routine continues at block 1007. Otherwise, the routine continues at block 1014.

At block 1007, the routine determines whether the date on which the routine is invoked is the date of the reminder. If the date on which the routine is invoked is the date of the reminder, the routine continues at block 1008. Otherwise, the routine continues at block 1014. In some embodiments, the routine may check whether the date on which the routine is invoked occurs near or after the reminder date indicated in the stored information. As an example, it may be acceptable to send a reminder a day before the reminder date. As a further example, the routine may send a reminder if the reminder date has passed but the reminder has not yet been sent.

At block 1008, the routine invokes a select_gift subroutine to select a gift based on the stored criteria. The routine provides the occasion identifier to the select_gift subroutine so that the subroutine can retrieve criteria for the selected occasion identifier. The select_gift subroutine is described in further detail below in relation to FIG. 11. In some embodiments, the routine may provide the retrieved criteria to the subroutine instead of (or in addition to) the occasion identifier.

At block 1010, the routine stores an identification of the gift selected by the select_gift subroutine. As an example, the routine may associate the selected gift with the occasion identifier. At block 1012, the routine sends a notification or reminder to the user. In various embodiments, the routine may send the notification or reminder to the user's e-mail address, plog, both, or neither, depending on the user's indicated preferences. The notification may include an indication of the selected gift. Upon receiving the notification, the gifter can cancel the gifting or change the selected gift. If the gifter changes the selected gift, an indication of the selected gift is stored to replace the gift selected by the routine at block 1008. If the gifting is canceled, an indication of the cancellation may be stored in association with the occasion identifier. As examples, a notation may be made that the gifting is canceled or the information may be deleted from the storage. If the user manually sent a gift to the recipient recently, the notification may remind the gifter of the manual gifting so that the gifter can elect to change the gift or cancel the automated gifting. The gifter can also manually send a gift immediately and cancel the automated gifting. The routine then continues at block 1014.

At block 1014, the routine determines whether the date on which the routine is invoked is the date on which the gift is to be sent. In some embodiments, the routine may determine that a gift is to be sent at an earlier date than the occasion. As an example, the routine may determine that the gift could take three days before it is delivered to the recipient. In such a case, the routine may determine that the gift should be sent at least three business days earlier than the occasion. The routine may also account for probable delays in transit. As an example, the facility may determine that gifts sent during December take a longer time to deliver than at other times of the year and send gifts early. The routine may also wait until after a "lock-in" date. The gifter may have specified a lock-in date after which the facility can send the gift automatically. If the routine determines that the date on which the routine is invoked is the date on which the gift is to be sent, the routine continues at block 1016. Otherwise, the routine continues at block 1026.

At block 1016, the routine determines whether a gift has been selected, such as by determining whether an identification of a gift has been stored in association with the selected occasion identifier. This identification of a gift could have been stored by the routine at block 1010. However, if no notification was sent, the routine would not have executed the logic of block 1010, and the routine would need to select a gift. If the gift has been selected, the routine continues at block 1018. Otherwise, the routine continues at block 1024.

At block 1018, the routine retrieves the stored identification of the selected gift. At block 1020, the routine sends the gift. In various embodiments, the facility operates in conjunction with other e-commerce facilities that receive identifications of gifts, recipients, gifters, and so forth so that appropriate parties can be billed and gifted items retrieved from warehouse storage and sent via conventional delivery methods.

At block 1022, the routine removes the occasion identifier from the list of occasion identifiers so that another gift is not sent when the facility invokes the routine again. In some embodiments, the routine may merely make a notation that the automated gifting for the selected occasion identifier has already been completed.

At block 1026, the routine selects another occasion identifier. When all occasion identifiers have been processed, the routine continues at block 1028 where it returns. Otherwise, the routine continues at block 1006 with the newly selected occasion identifier.

Returning to block 1016, if a gift has not been selected, the routine invokes the select_gift subroutine at block 1024 and provides an indication of the selected occasion identifier to the subroutine. The routine then continues at block 1020 and the gift is sent.

FIG. 11 is a flow diagram illustrating a select_gift routine invoked by the facility in some embodiments. The select_gift routine can be invoked by the send_gift routine described above in relation to FIG. 10. The select_gift routine starts at block 1102 where it receives an indication of an occasion identifier as a parameter. At block 1104, the routine retrieves criteria previously stored for the indicated occasion identifier.

At block 1106, the routine attempts to select a gift based on the retrieved criteria. In some embodiments, the routine may additionally consider criteria not provided by the gifter when selecting the gift. As an example, the routine may determine that the recipient has previously purchased an identical or similar item (e.g., by using the Web merchant software associated with the facility), the gifter has previously sent an identical or similar gift, and so forth.

At block 1108, the routine determines whether a gift was selected at block 1106. As an example, if the criteria are too narrow, no gift may be selected. If a gift was selected, the routine continues at block 1110 where it returns an identification of the selected gift. Otherwise, the routine continues at block 1112.

At block 1112, the routine indicates to propose a relaxation of the criteria. As an example, when the send_gifts routine sends a notification or reminder to the gifter, the routine may send a request to relax the criteria because no gift could be selected. The notification can be sent as an e-mail message, plog entry, telephone call, fax, postal mail, and so forth. The notification can also be placed on a web page requested by the gifter. An example of a notification is described below in relation to FIG. 12. In some embodiments, the routine returns an indication to propose the relaxation of the criteria and returns. In such embodiments, a notation may be made to reattempt to select a gift at a later date. In other embodiments, the routine continues at block 1114 where it determines whether the user has indicated that criteria can be relaxed. If criteria can be relaxed, the routine continues at block 1106. Otherwise, the routine continues at block 1116 where it returns a failure indicating that no gift could be selected. Those skilled in the art will recognize that in a Web application, long delays may occur between execution of logic associated with a pair of blocks. As an example, upon providing a notification to a gifter at block 1112, the routine may continue at block 1114 after some period of time (e.g., after a user submits a web form or responds to an e-mail message indicating to relax criteria).

In various embodiments, the facility receives indications from users for default user preference settings. As an example, the user can indicate that when the facility cannot automatically select a gift, one or more criteria can be automatically relaxed until a gift can be selected. The user may be able to provide a prioritization or ordering for relaxation of the criteria (e.g., product category followed by price range). Alternatively, the user may indicate that the facility can select criteria to relax. As an example, the facility may select criteria to relax in opposite order of the order in which the user selected the criteria. As another example, the facility may select criteria to relax based on a predetermined ordering (e.g., product color before product category). As a result, the facility may then be able to select and send a gift even when the user does not explicitly relax the criteria when the facility proposes criteria relaxation to the user. In these embodiments, the logic illustrated in FIG. 11 can be modified as follows. At block 1112, the proposal to relax criteria may or may not be sent. At block 1114, the routine may determine whether to relax the criteria based on a preference indicated by the user, and may automatically relax criteria, such as in an order indicated by the user or automatically. An example of criteria relaxation follows. Suppose the user had selected as criteria (1) a wish list, and (2) a price range of $15 to $25, but the wish list contains no items in this price range. Suppose further that the user had indicated that the wish list criteria can be relaxed before the price range. When the facility selects a gift, it would relax the wish list criterion to identify a gift matching the price range criteria even though the gift does not appear in the wish list. The facility may employ other criteria to select the gift, such as the gifter's purchase patterns, recipient's purchase patterns, other wish lists associated with the recipient, and so forth.

Figure 12:
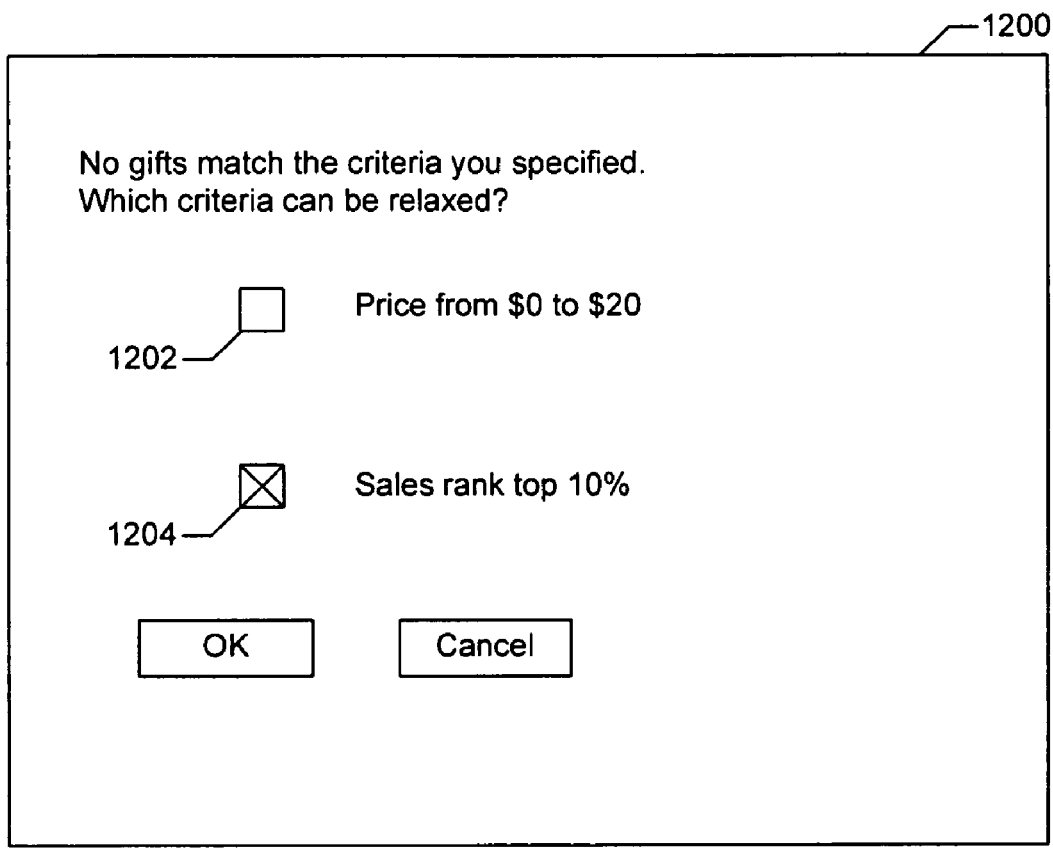
FIG. 12 is an example of a display diagram illustrating a user interface for providing a notification to relax criteria.

FIG. 12 is a display diagram illustrating a user interface for providing a notification to relax criteria. In various embodiments, the user interface 1200 provides an indication that no gift could be selected and proposes to relax criteria. As an example, the user interface indicates criteria that were previously provided by the gifter. Each criterion has an associated checkbox or priority indicator to enable the gifter to select criteria to relax and optionally select an order for relaxing the criteria. In the illustrated example, the gifter has indicated that the price criterion cannot be relaxed by not checking checkbox 1202 and has indicated that the sales rank criterion can be relaxed by checking checkbox 1204. The facility may automatically relax some criteria, such as in the order (or reverse order) the gifter provided the criteria.

In various embodiments, the facility provides options to gifters relating to when or which notifications are to be sent by the facility. As examples, the gifter may indicate whether or not the gifter desires a notification at all, when no gift matches the criteria, when a gift is selected, when a gift is sent, when a gift is received by the recipient, when a gift for an occasion has already been sent, and so forth. A gifter may be able to finely tune when the facility sends a notification. As an example, the gifter may desire to be informed when a price criterion needs to be relaxed, but not when a color criterion needs to be relaxed.

Some criteria may need to be modified regularly. As an example, criteria for selecting a birthday gift may need to be revised annually so that a similar gift is not sent every year. In some embodiments, the facility notifies the gifter that a periodic occasion (e.g., birthday, holiday, etc.) is going to occur soon and prompts the gifter to revise criteria. In some embodiments, the facility automatically revises criteria. As an example, the facility may determine that a child is a year older and identify an age-appropriate toy for the child's birthday.

When a gift has already been sent matching criteria provided by a gifter, the facility may send a notification to the gifter indicating that a gift matching the criteria has already been sent and requesting the gifter to specify different criteria.

In various embodiments, the facility automatically sends an inquiry to recipients relating to a gift. As an example, when the facility (or gifter) selects a sweater, the facility may send an inquiry to the gift recipient to request size, color preference, and other attributes relating to the sweater. As another example, the gifter or facility may select multiple gifts and send an inquiry to the recipient to select one or more of the multiple gifts. The facility may then send the gifts matching the recipient's preference in addition to the gifter's criteria. The gifter can indicate whether or not to send inquiries to gift recipients.

In various embodiments, the facility may be combined with aspects of a facility for converting gifts that is described in U.S. patent application Ser. No. 11/370,772, which is entitled "System and Method for Converting Gifts," and which was filed on Mar. 8, 2006, the disclosure of which is incorporated herein in its entirety by reference. As an example, a gift that is sent to a recipient may be automatically converted to another item that the recipient may find more desirable. This conversion can be based on various rules provided by the gifter, recipient, or both.

Those skilled in the art that will appreciate that the above-described facility may be straightforwardly adapted or extended in various ways. As an example, the facility can be used to automatically make a gift of services (e.g., by sending a gift certificate that can be redeemed for the services). As another example, the gifter can also be the recipient. As another example, traditional user interfaces may be used instead of Web pages. As another example, a gifter can provide no criteria, a single criterion, or multiple criteria that the facility can employ to select gifts. The facility can also add additional criteria implicitly. As an example, when the facility selects a toaster automatically, it may select a green toaster based on the gifter's or recipient's prior gifts or purchases. While the foregoing description makes reference to particular embodiments, the scope of the invention is defined solely by the claims that follow and the elements recited therein.

We claim:

1. A method performed by a computing system for gifting automatically, comprising:
    storing, as received from a first person, an identification of a second person, an occasion, and a gift selection criterion, wherein the first person is a person who is gifting and the second person is a recipient of a gift;
    receiving from a third person the identification of the second person;
    automatically selecting, by the computing system, a gift for the stored occasion based on at least the stored received gift selection criterion, wherein the automatically selecting the gift for the occasion includes ensuring that the gift to be sent on behalf of the first person is different from a gift sent on behalf of the third person;
    prior to the stored occasion, sending a notification to the first person indicating the automatically selected gift that will be sent after a time period following the notification; and
    upon elapse of the time period, sending the gift to the second person without further input from the first person.

2. The method of claim 1, wherein the identification of a second person is the second person's electronic mail address.

3. The method of claim 1, wherein the identification of a second person is the second person's postal address.

4. The method of claim 1, wherein the identification of a second person is the second person's telephone number.

5. The method of claim 1, wherein the identification of a second person is the second person's user identifier.

6. The method of claim 1, wherein the gift is selected based on the received gift selection criterion and a determination of whether the gift appears on a wish list.

7. The method of claim 1, wherein the sending a notification includes sending a message to the first person.

8. The method of claim 7 wherein the message is an electronic mail message.

9. The method of claim 7 wherein the message is a telephone message.

10. The method of claim 7 wherein the message is a fax message.

11. The method of claim 7 wherein the message is a postal message.

12. The method of claim 1, wherein the sending a notification includes providing a Web page.

13. The method of claim 1, further comprising receiving an explicit gift selection from the first person wherein the gift selected by the first person is different from the automatically selected gift, wherein the gift selected by the first person is sent instead of the automatically selected gift.

14. The method of claim 1, further comprising receiving an indication of a lock-in date, before which the gift is not sent and after which the first person cannot cancel sending the gift.

15. The method of claim 1, wherein the gift is sent within a range of dates identified by the first person.

16. The method of claim 1, wherein the gift is sent on a calculated date so that it arrives no earlier than a specified date associated with the stored occasion.

17. The method of claim 1, wherein:
    the storing further comprises receiving from the first person multiple gift selection criteria;
    in response to finding a potential gift matching the stored multiple gift selection criteria, automatically selecting the gift based on all of the stored multiple gift selection criteria;
    in response to finding no potential gift matching the stored multiple gift selection criteria, relaxing one of the stored multiple gift selection criteria.

18. The method of claim 17, wherein the received multiple gift selection criteria are relaxed in an order indicated by the first person.

19. The method of claim 1, further comprising sending a second notification to the first person wherein the second notification indicates that a gift was automatically selected for the occasion.

20. A computer-implemented system for automatically selecting a gift for sending to a gift recipient based at least on a criterion provided by a gifter, comprising:
    a server computer system that stores, as received from the gifter, an identification of the gift recipient, the criterion, and an occasion, wherein the server computer system receives from a third person the identification of the gift recipient;
    a first merchant software component that automatically selects a gift to send to the gift recipient for the stored occasion based at least on the stored criterion, wherein the automatically selecting the gift for the occasion includes ensuring that the gift to be sent on behalf of the gifter is different from a gift sent on behalf of the third person; and
    prior to the stored occasion, sending a notification to the first person indicating the automatically selected gift that will be sent after a time period following the notification;
    a second merchant software component that, upon elapse of the time period, sends the automatically selected gift to the gift recipient without further input from the gifter.

21. The system of claim 20 wherein the storing further comprises receiving from the gifter multiple gift selection criteria;
    the first merchant software relaxes at least one of the received multiple criteria when a gift cannot be automatically selected based on all of the received multiple criteria.

22. The system of claim 20 further comprising notifying the gifter that a gift for the occasion has already been sent.

23. The system of claim 20, wherein the identification of a second person is the second person's electronic mail address.

24. The system of claim 20, wherein the identification of a second person is the second person's telephone number.

25. The system of claim 20, wherein the identification of a second person is the second person's user identifier.

26. The system of claim 20, wherein the gift is selected based on the received gift selection criterion and a determination of whether the gift appears on a wish list.

27. The system of claim 20, wherein the sending a notification includes sending an electronic mail message to the first person.

28. The system of claim 20, wherein the sending a notification includes sending a telephone message to the first person.

29. The system of claim 20, wherein the sending a notification includes providing a Web page.

30. The system of claim 20, further comprising the server computer system receiving an explicit gift selection from the first person wherein the gift selected by the first person is different from the automatically selected gift, wherein the gift selected by the first person is sent instead of the automatically selected gift.

31. The system of claim 20, further comprising receiving at the server computer system an indication of a lock-in date, before which the gift is not sent and after which the first person cannot cancel sending the gift.

32. A non-transitory computer-readable medium having computer-executable instructions that, when executed, perform a method of gifting automatically, the method comprising:
    storing, as received from a first person an identification of a second person, an indication of an occasion, and a gift selection criterion, wherein the first person is a person who is gifting and the second person is a recipient of a gift;
    receiving from a third person the identification of the second person;
    automatically selecting, by a computing system, a gift for the occasion based on at least the received gift selection criterion, wherein the automatically selecting the gift for the occasion includes ensuring that the gift to be sent on behalf of the first person is different from a gift sent on behalf of the third person;
    prior to the stored occasion, sending a notification to the first person indicating the automatically selected gift that will be sent after a time period following the notification; and
    upon elapse of the time period, sending the gift to the second person without further input from the first person.

33. The computer-readable medium of claim 32 wherein the method further comprises receiving an indication from the first person to change the automatically selected gift, the indication including an identification of an alternative gift, wherein the alternative gift selected by the first person is sent instead of the automatically selected gift.

34. The computer-readable medium of claim 32 wherein the method further comprises generating a set of items representing potential gifts based on at least the received gift selection criterion and displaying the generated set of items to the first person.

35. The computer-readable medium of claim 32 further comprising sending a second notification to the first person wherein the second notification indicates that a gift was automatically selected for the occasion.

36. The computer-readable medium of claim 32, wherein the identification of a second person is the second person's electronic mail address.

37. The computer-readable medium of claim 32, wherein the identification of a second person is the second person's telephone number.

38. The computer-readable medium of claim 32, wherein the identification of a second person is the second person's user identifier.

39. The computer-readable medium of claim 32, wherein the sending a notification includes sending an electronic mail message to the first person.

40. The computer-readable medium of claim 32, wherein the sending a notification includes sending a telephone message to the first person.

41. The computer-readable medium of claim 32, wherein the sending a notification includes providing a Web page.

42. The computer-readable medium of claim 32, further comprising receiving an indication of a lock-in date, before which the gift is not sent and after which the first person cannot cancel sending the gift.

43. The computer-readable medium of claim 32, wherein:
    the storing further comprises receiving from the first person multiple gift selection criteria;
    in response to finding a potential gift matching the stored multiple gift selection criteria, automatically selecting the gift based on all of the stored multiple gift selection criteria;
    in response to finding no potential gift matching the stored multiple gift selection criteria, relaxing one of the stored multiple gift selection criteria.

44. The computer-readable medium of claim 32, further comprising sending a second notification to the first person wherein the second notification indicates that a gift was automatically selected for the occasion.

45. A method performed by a computing system for gifting automatically, comprising:
    storing, as received from a first person, an identification of a second person, an occasion, and a gift selection criterion, wherein the first person is a person who is gifting and the second person is a recipient of a gift;
    automatically selecting, by the computing system, a gift for the stored occasion based on at least the stored received gift selection criterion, wherein automatically selecting includes ensuring that the selected gift was not previously purchased by the second person;
    prior to the stored occasion, sending a notification to the first person indicating the automatically selected gift that will be sent after a time period following the notification; and
    upon elapse of the time period, sending the gift to the second person without further input from the first person.

46. The method of claim 45, wherein the identification of a second person is the second person's electronic mail address.

47. The method of claim 45, wherein the identification of a second person is the second person's telephone number.

48. The method of claim 45, wherein the identification of a second person is the second person's user identifier.

49. The method of claim 45, wherein the gift is selected based on the received gift selection criterion and a determination of whether the gift appears on a wish list.

50. The method of claim 45, wherein the sending a notification includes sending an electronic mail message to the first person.

51. The method of claim 45, wherein the sending a notification includes sending a telephone message to the first person.

52. The method of claim 45, wherein the sending a notification includes providing a Web page.

53. The method of claim 45, further comprising receiving an explicit gift selection from the first person wherein the gift selected by the first person is different from the automatically selected gift, wherein the gift selected by the first person is sent instead of the automatically selected gift.

54. The method of claim 45, further comprising receiving an indication of a lock-in date, before which the gift is not sent and after which the first person cannot cancel sending the gift.

55. The method of claim 45, wherein:
the storing further comprises receiving from the first person multiple gift selection criteria;
in response to finding a potential gift matching the stored multiple gift selection criteria, automatically selecting the gift based on all of the stored multiple gift selection criteria;
in response to finding no potential gift matching the stored multiple gift selection criteria, relaxing one of the stored multiple gift selection criteria.

56. The method of claim 45, further comprising sending a second notification to the first person wherein the second notification indicates that a gift was automatically selected for the occasion.

57. A computer-implemented system for automatically selecting a gift for sending to a gift recipient based at least on a criterion provided by a gifter, comprising:
a server computer system that stores, as received from the gifter, an identification of the gift recipient, the criterion, and an occasion;
a first merchant software component that automatically selects a gift to send to the gift recipient for the stored occasion based at least on the stored criterion, wherein the automatically selecting includes ensuring that the selected gift was not previously purchased by the gift recipient; and
prior to the stored occasion, sending a notification to the first person indicating the automatically selected gift that will be sent after a time period following the notification;
a second merchant software component that, upon elapse of the time period, sends the automatically selected gift to the gift recipient without further input from the gifter.

58. The system of claim 57, wherein the identification of a second person is the second person's electronic mail address.

59. The system of claim 58, wherein the identification of a second person is the second person's telephone number.

60. The system of claim 58, wherein the identification of a second person is the second person's user identifier.

61. The system of claim 58, wherein the gift is selected based on the received gift selection criterion and a determination of whether the gift appears on a wish list.

62. The system of claim 58, wherein the sending a notification includes sending an electronic mail message to the first person.

63. The system of claim 58, wherein the sending a notification includes sending a telephone message to the first person.

64. The system of claim 58, wherein the sending a notification includes providing a Web page.

65. The system of claim 58, further comprising receiving at the server computer system an explicit gift selection from the first person wherein the gift selected by the first person is different from the automatically selected gift, wherein the gift selected by the first person is sent instead of the automatically selected gift.

66. The system of claim 58, further comprising receiving at the server computer system an indication of a lock-in date, before which the gift is not sent and after which the first person cannot cancel sending the gift.

67. The system of claim 58, wherein:
the storing by the server further comprises receiving from the first person multiple gift selection criteria;
in response to finding a potential gift matching the stored multiple gift selection criteria, the first merchant software component automatically selects the gift based on all of the stored multiple gift selection criteria;
in response to finding no potential gift matching the stored multiple gift selection criteria, the first merchant software component relaxes one of the stored multiple gift selection criteria.

68. The system of claim 58, further comprising the server computer system sending a second notification to the first person wherein the second notification indicates that a gift was automatically selected for the occasion.

69. A non-transitory computer-readable medium having computer-executable instructions that, when executed, perform a method of gifting automatically, the method comprising:
storing, as received from a first person an identification of a second person, an indication of an occasion, and a gift selection criterion, wherein the first person is a person who is gifting and the second person is a recipient of a gift;
automatically selecting, by a computing system, a gift for the occasion based on at least the received gift selection criterion, wherein the automatically selecting includes ensuring that the selected gift was not previously purchased by the second person;
prior to the stored occasion, sending a notification to the first person indicating the automatically selected gift that will be sent after a time period following the notification; and
upon elapse of the time period, sending the gift to the second person without further input from the first person.

70. The computer-readable medium of claim 69, wherein the identification of a second person is the second person's electronic mail address.

71. The computer-readable medium of claim 69, wherein the identification of a second person is the second person's telephone number.

72. The computer-readable medium of claim 69, wherein the identification of a second person is the second person's user identifier.

73. The computer-readable medium of claim 69, wherein the gift is selected based on the received gift selection criterion and a determination of whether the gift appears on a wish list.

74. The computer-readable medium of claim 69, wherein the sending a notification includes sending an electronic mail message to the first person.

75. The computer-readable medium of claim 69, wherein the sending a notification includes sending a telephone message to the first person.

76. The computer-readable medium of claim 69, wherein the sending a notification includes providing a Web page.

77. The computer-readable medium of claim 69, further comprising receiving an explicit gift selection from the first person wherein the gift selected by the first person is different from the automatically selected gift, wherein the gift selected by the first person is sent instead of the automatically selected gift.

78. The computer-readable medium of claim 69, further comprising receiving an indication of a lock-in date, before which the gift is not sent and after which the first person cannot cancel sending the gift.

79. The computer-readable medium of claim 69, wherein:
the storing further comprises receiving from the first person multiple gift selection criteria;

in response to finding a potential gift matching the stored multiple gift selection criteria, automatically selecting the gift based on all of the stored multiple gift selection criteria;

in response to finding no potential gift matching the stored multiple gift selection criteria, relaxing one of the stored multiple gift selection criteria.

80. The computer-readable medium of claim 69, further comprising sending a second notification to the first person wherein the second notification indicates that a gift was automatically selected for the occasion.

\* \* \* \* \*